United States Patent
Robinson et al.

(10) Patent No.: US 7,588,059 B2
(45) Date of Patent: Sep. 15, 2009

(54) DISPENSING TOOL ASSEMBLY FOR EVACUATING AND CHARGING A FLUID SYSTEM

(75) Inventors: Randy S. Robinson, Bradford, OH (US); Chad E. McKee, Springfield, OH (US); Matthew A. Smith, Dayton, OH (US)

(73) Assignee: Production Control Units, Inc., Dayton, OH (US)

( * ) Notice: Subject to any disclaimer, the term of this patent is extended or adjusted under 35 U.S.C. 154(b) by 377 days.

(21) Appl. No.: 11/298,133

(22) Filed: Dec. 9, 2005

(65) Prior Publication Data

US 2007/0144611 A1    Jun. 28, 2007

(51) Int. Cl.
*B65B 31/04* (2006.01)
*B65B 3/04* (2006.01)
*F25B 45/00* (2006.01)
*F16L 37/28* (2006.01)

(52) U.S. Cl. .................... 141/65; 141/302; 141/383; 62/292; 251/149.9; 285/316

(58) Field of Classification Search ............... 141/2, 141/5, 7, 18, 65, 348, 349, 383, 386, 57, 141/147, 302, 309; 62/292; 251/149.9; 285/316
See application file for complete search history.

(56) References Cited

U.S. PATENT DOCUMENTS

| | | | | |
|---|---|---|---|---|
| 4,021,132 A | * | 5/1977 | Benjamin et al. | 408/127 |
| 4,869,300 A | * | 9/1989 | Gudenau et al. | 141/59 |
| 4,889,149 A | * | 12/1989 | Weaver et al. | 137/1 |
| 5,080,132 A | * | 1/1992 | Manz et al. | 137/614.04 |
| 5,244,010 A | * | 9/1993 | Barjasteh et al. | 137/614.05 |
| RE34,426 E | * | 11/1993 | Weaver et al. | 141/302 |
| RE34,715 E | * | 9/1994 | Gudenau et al. | 141/59 |
| 5,450,875 A | * | 9/1995 | Chichester et al. | 137/614.05 |
| 5,560,407 A | | 10/1996 | Swinford | |
| 6,029,720 A | * | 2/2000 | Swinford | 141/385 |
| 6,238,152 B1 | * | 5/2001 | Fujimoto et al. | 409/233 |
| 6,257,285 B1 | | 7/2001 | Robinson | |
| 6,273,397 B1 | * | 8/2001 | Schultz et al. | 137/614.18 |
| 6,298,886 B1 | * | 10/2001 | Robinson et al. | 141/385 |
| 6,539,970 B1 | * | 4/2003 | Knowles et al. | 137/238 |
| 6,634,342 B1 | * | 10/2003 | Wouters et al. | 123/516 |
| 6,776,186 B2 | | 8/2004 | Swinford | |
| 6,799,614 B1 | * | 10/2004 | Smith et al. | 141/312 |
| 6,837,064 B2 | * | 1/2005 | Knowles | 137/614.06 |

* cited by examiner

*Primary Examiner*—Timothy L Maust
*Assistant Examiner*—Nicolas A Arnett
(74) *Attorney, Agent, or Firm*—Jacox, Meckstroth & Jenkins

(57) ABSTRACT

A fluid dispensing tool assembly includes an upper tool unit having an evacuation port and a fluid inlet port with fluid actuated poppet valves selectively controlling the flow through each port to a center passage within the upper tool unit. The assembly also has a lower tool unit connected to the upper tool unit by a quick-release coupler and includes a center tube member projecting into the passage and also into the inlet portion of a fluid receiving system. The tube member is shifted axially by a fluid actuated piston within the lower tool unit to form a fluid-tight seal with the inlet portion after a second coupler secures the tool assembly to the inlet portion. A fluid-tight seal may be formed between an annular seat on a plastic inlet portion of the receiving system and an annular shoulder on the tube member within the lower tool unit.

6 Claims, 3 Drawing Sheets

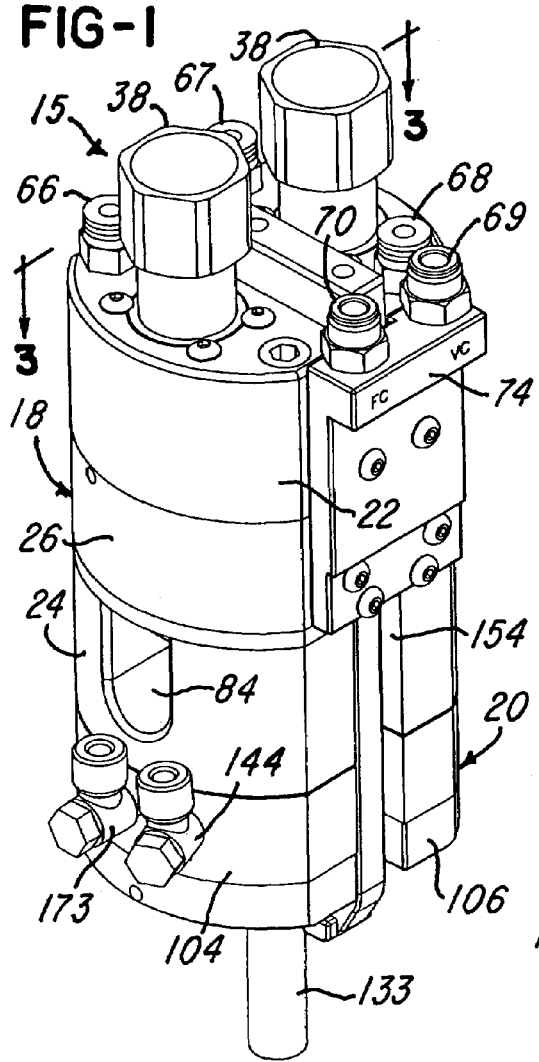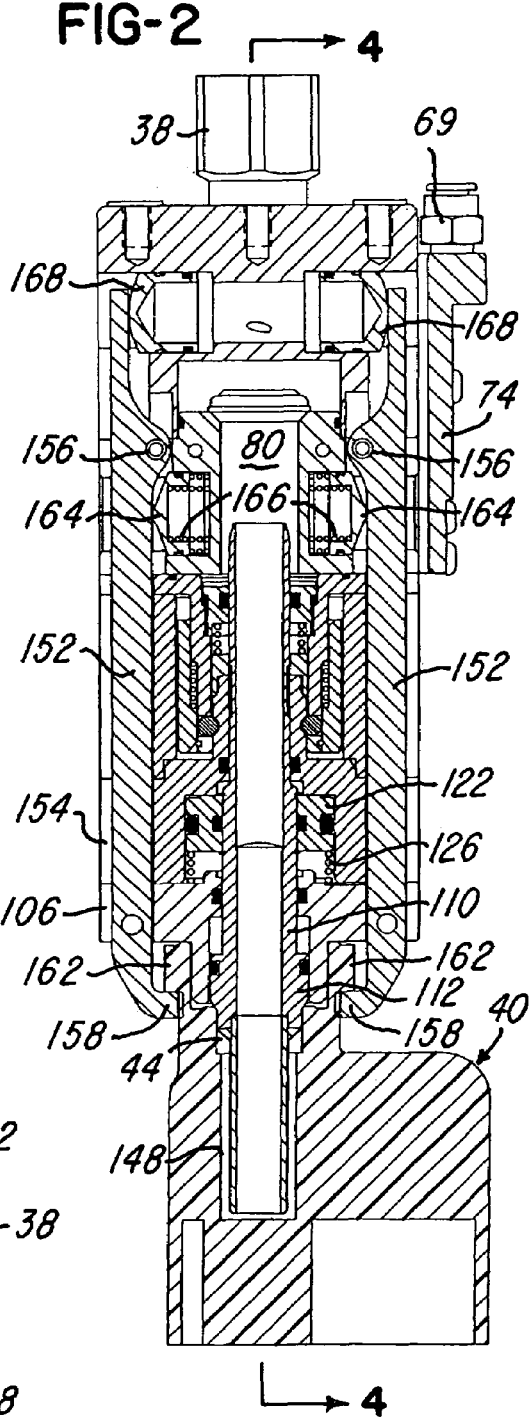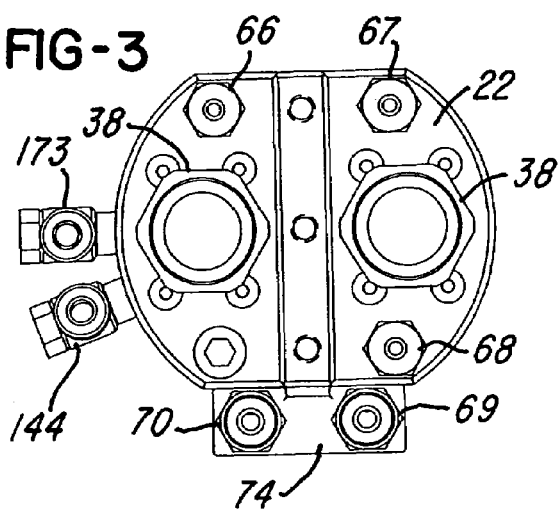

FIG-4
FIG-5
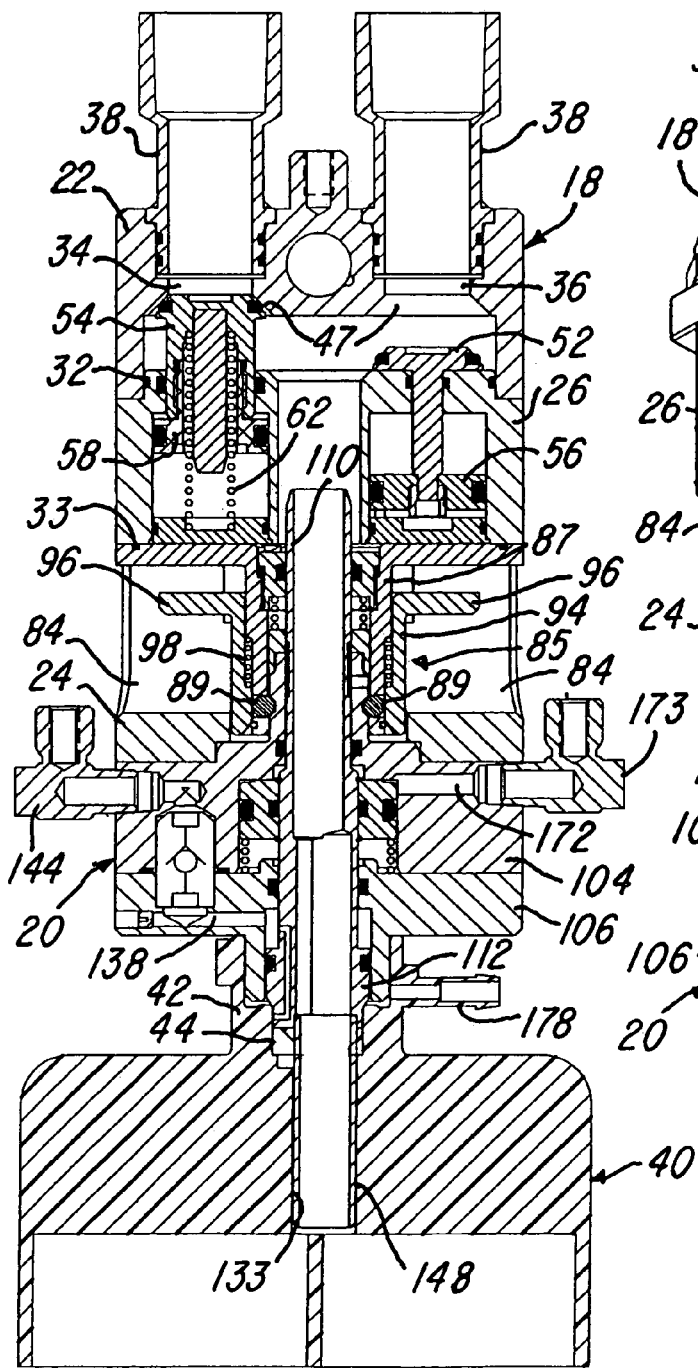
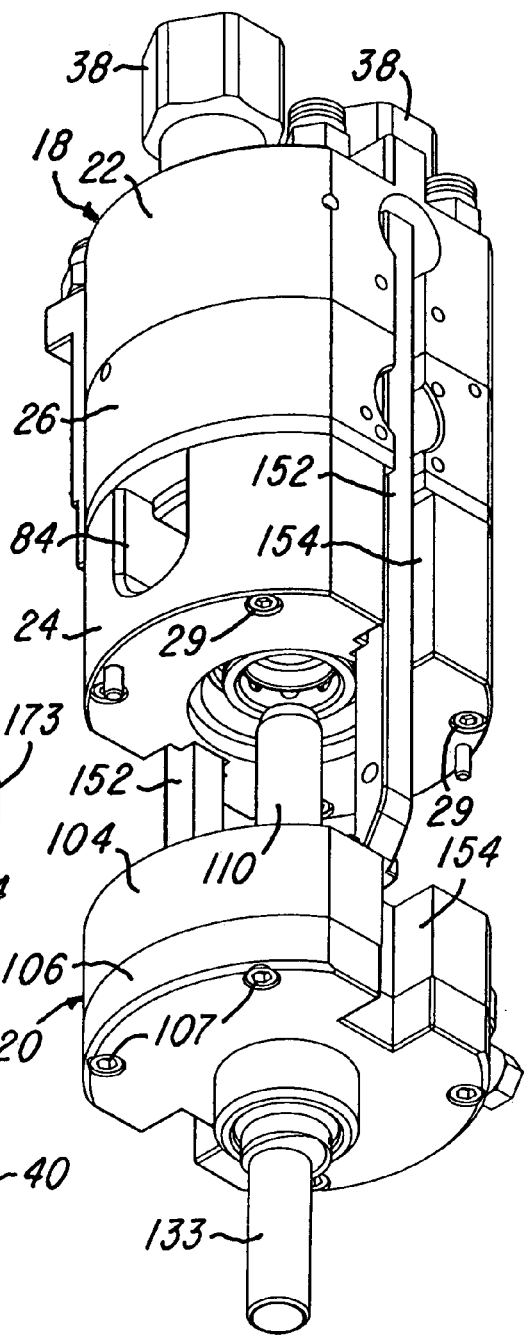

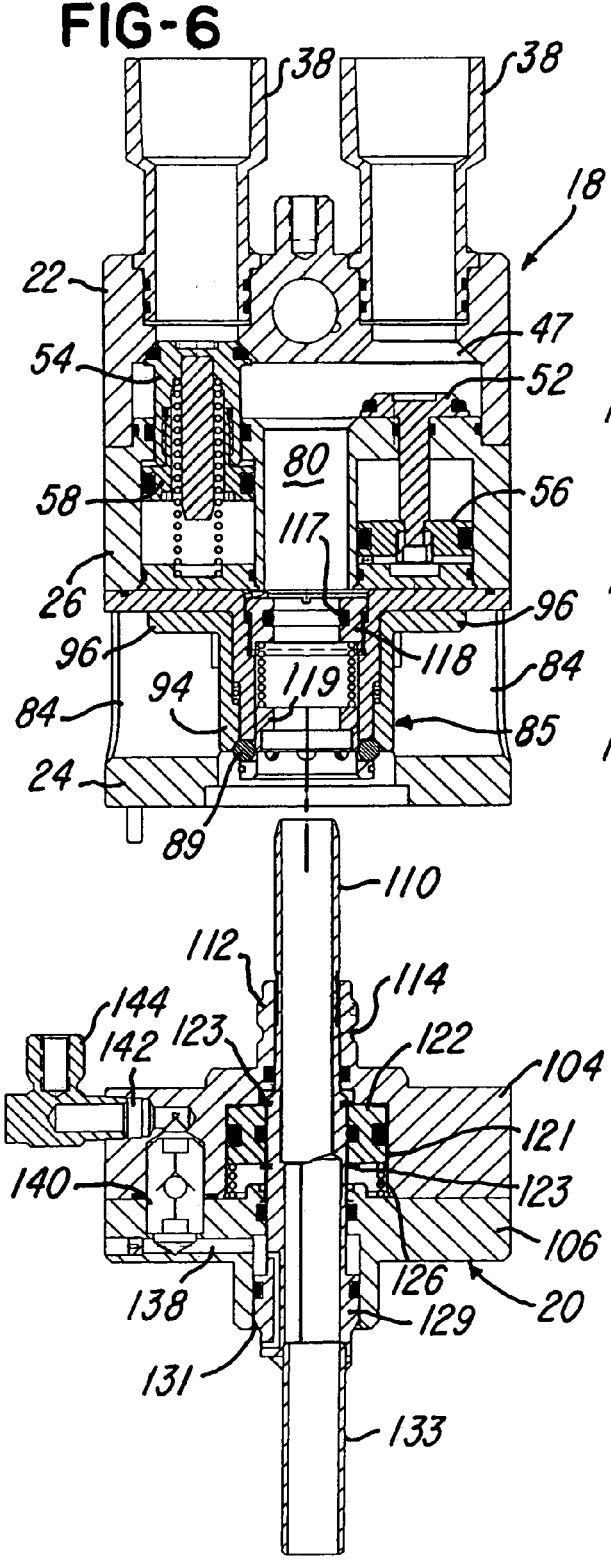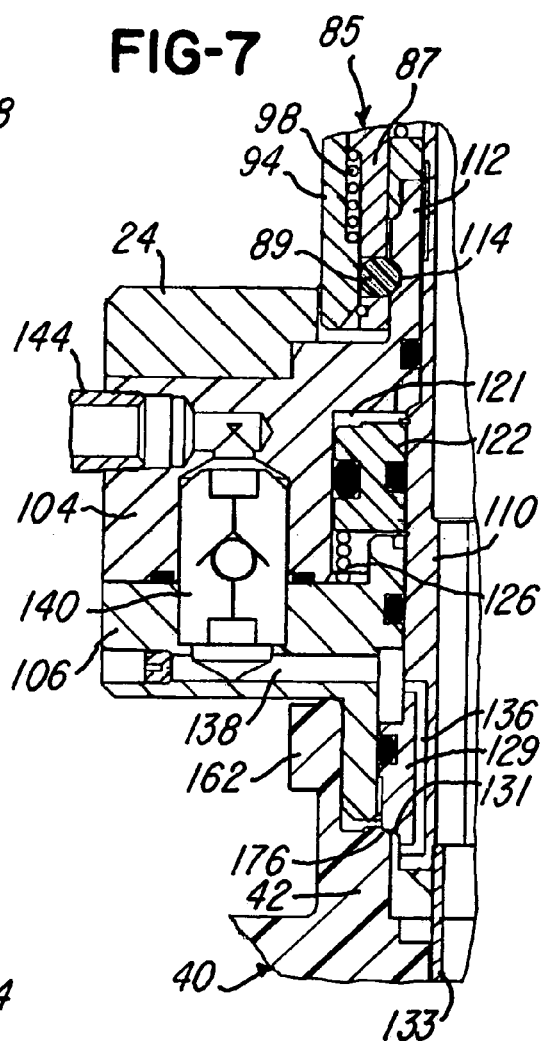

DISPENSING TOOL ASSEMBLY FOR EVACUATING AND CHARGING A FLUID SYSTEM

BACKGROUND OF THE INVENTION

This invention relates to a dispensing tool assembly of the type disclosed in U.S. Pat. No. 6,257,285 which issued to the assignee of the present invention and the disclosure of which is herein incorporated by reference. Similar types of tool assemblies are disclosed in U.S. Pat. No. 5,560,407 and No. 6,776,186. Such tool assemblies or tools are commonly used for evacuating, pressure testing and filling or charging fluid receiving systems on motor vehicles, such as, for example, a power steering mechanism, a radiator and coolant system, a fuel tank system and an air conditioning system. Usually, the tool assembly is supported for vertical and horizontal movement by a suspension cable and counterweight system and includes a lower tubular portion which couples with an inlet portion of the fluid system. The tubular portion is usually sealed to the inlet portion by a resilient sealing ring compressed axially by a fluid actuated piston. A flexible air suction line and a flexible liquid supply line are connected to the top of the tool assembly along with flexible pressure control lines or tubes which actuate the sealing piston and internal valves for controlling the flow of fluid in the form of liquid or air through the tool assembly.

When a tool assembly is used on a motor vehicle production assembly line, different model vehicles may be produced on the assembly line, and the change from one vehicle to another vehicle may be made without stopping a continuous moving assembly line. When a model change is made on the assembly line, it has been found desirable to provide for quickly changing a lower portion or section of the tool assembly without unthreading screws or parts in order to accommodate the inlet portion of a fluid system on a different model vehicle instead of changing the entire tool assembly. It is also usually necessary to replace the resilient sealing ring carried by the tool assembly to form a fluid-tight seal between the tool assembly and the inlet portion of the fluid system. This replacement is required due to wear of the sealing ring and sometimes must be made frequently or several times during a day of operation of the vehicle assembly line. The replacement of the sealing ring requires significant time which interrupts the use of the tool assembly.

SUMMARY OF THE INVENTION

This invention is directed and improved dispensing tool assembly of the type disclosed in above mentioned U.S. Pat. No. 6,257,285 and which provides for quickly replacing or interchanging a lower tool unit of the tool assembly to accommodate different forms or configurations of inlet portions of different fluid receiving systems which may be in the form, for example, of a motor vehicle coolant system, fuel tank system, air conditioning system or power steering system. This feature is provided by a quick release coupler or coupling mechanism including a locking member movable between a locked position and a released position. The tool assembly of the invention may also provide for eliminating the resilient sealing ring to form a fluid-tight seal between the tool assembly and the inlet portion of the fluid receiving system. That is, as an option, the tool assembly of the invention provides for obtaining a fluid-tight seal directly between an annular shoulder or surface on a metal discharge tube and an annular seat on a plastic inlet portion of the fluid receiving system.

Other features and advantages of the invention will be apparent from the following description, the accompanying drawings and the appended claims.

BRIEF DESCRIPTION OF THE DRAWINGS

FIG. 1 is a perspective view of a dispensing tool assembly constructed in accordance with the invention;

FIG. 2 is an axial section of the tool assembly shown in FIG. 1 and shown coupled to a plastic inlet portion of a fluid receiving system;

FIG. 3 is a top view of the tool assembly, taken generally on the line 3-3 of FIG. 1;

FIG. 4 is another axial section of the tool assembly and fluid receiving system, taken generally on the line 4-4 of FIG. 2;

FIG. 5 is another perspective view of the tool assembly shown in FIG. 1 and with a lower tool section or unit of the assembly released and separated from an upper tool section or unit of the assembly;

FIG. 6 is an axial section of the separated tool units of the assembly shown in FIG. 5, and FIG. 7 is an enlarged fragmentary section, showing the seal between the lower tool unit and fluid system inlet portion, as also shown in FIG. 4.

DESCRIPTION OF ONE EMBODIMENT

FIG. 1 illustrates a dispensing tool assembly 15 constructed in accordance with the invention and which includes an upper tool assembly or unit 18 releasably coupled to a lower tool assembly or unit 20. The upper tool unit 18 includes an upper body section 22, a lower body section 24 and an intermediate body section 26 each formed of metal and secured together by a set of screws 29 (FIG. 5). A set of resilient O-rings 32 and 33 (FIG. 4) form fluid-tight seals between the sections 22, 24 and 26 of the upper tool unit 18. As also disclosed in above-mentioned U.S. Pat. No. 6,257,285, the upper tool unit 22 defines a fluid inlet port 34 and an evacuation port 36, and a pair of tubular fittings 38 connect the ports 34 and 36 to corresponding flexible fluid inlet and evacuation lines or tubes extending from a computer controlled machine which may provide for automatically evacuating, pressure testing and charging or filling a fluid system including, for example, a molded rigid plastic coolant reservoir 40 having a tubular neck portion 42 defining an inlet 44.

Each of the ports 34 and 36 extends from a tapered valve seat 47 which receives a corresponding fluid or air actuated poppet valve member 52 and 54 movable axially by corresponding air actuated pistons 56 and 58 within the body section 26. The valve members provide for selectively opening and closing the ports 34 and 36 in response to axial movement of the valve members 52 and 54, as disclosed in above mentioned U.S. Pat. No. 6,257,285. The fluid inlet valve member 54 is normally closed by a compression spring 62, and flexible air pressure control lines or tubes are connected to a set of fittings 66-70 projecting upwardly from the top of the body section 22 and from an air transfer block 74 attached to the body section 22. Controlled air pressure within four of the tubes control the opening and closing of the poppet valve members 52 and 54 according to a predetermined sequence of operation. The intermediate body section 26 also defines an axially extending center passage 80 which connects with either the evacuation passage or the fluid fill passage when the corresponding valve member 52 or 54 is in its open position.

The lower body section 24 of the upper tool unit 18 defines a pair of diametrically opposite finger receiving openings 84 and supports a quick release coupler 85 which includes a center tubular portion 87 having a series of peripherally spaced radial holes or openings which receive a corresponding set of metal balls 89. The balls are confined for corresponding radial movement and are surrounded by a tubular sleeve 94 having a pair of diametrically opposite upper tabs 96 projecting outwardly into the corresponding openings 84. A compression spring 98 is confined between the tubular portion 87 and the surrounding locking member or sleeve 94 and urges the sleeve 94 downwardly to a lock position with the balls 89 projecting inwardly from the tubular portion 87.

The lower tool unit 20 of the tool assembly 15 includes an annular body section 104 and an annular body section 106 secured together by a set of screws 107 (FIG. 5) and surrounding a center tubular member 110 which projects upwardly through a tubular portion 112 (FIG. 6) of the body section 104 and also upwardly through the coupler 85 into the passage 80. A circumferential groove 114 is formed within the tubular portion 112 and is located to receive the balls 89 of the coupler 85 when the lower tool unit 20 is assembled and coupled to the upper tool unit 18, as shown in FIG. 4. A resilient 0-ring seal 117 is retained within a bushing 118 in the upper portion of the body section 24 to form a fluid-tight seal between the upper tool unit 18 and the tubular member 110 of the lower tool unit 20. A spring biased ball retaining ring 119 is urged downwardly within the tubular portion 87 to retain the balls 89 when the tool unit 20 is removed from the tool unit 18 (FIG. 6). When it is desired to release the lower tool unit 20 quickly from the upper tool unit 18, an operator's finger is inserted into one of the openings 84 and presses upwardly on the corresponding tab 96 to lift the sleeve 94 upwardly, allowing the balls 89 to retract outwardly from the groove 114. The lower tool unit is then pressed downwardly by the ring 119 from the upper tool unit 18.

When it is desired to assemble or reassemble tool unit 20 with tool unit 18, the sleeve 94 is pulled upwardly by one of the tabs 96 so that the balls 89 move outwardly by the spring biased ring 119 where they are retained by the ring 119. This locks the sleeve 94 in its upper released position so that the operator may freely insert the tool unit 20 without continuing to hold upwardly on one of the tabs 96. When the top end of the tubular portion 112 presses upwardly on the locking ring 119, the balls 89 are released and will shift inwardly into the groove 114 where the balls are locked by downward movement of the surrounding sleeve 94 so that the unit 20 is locked to the unit 18.

Referring to FIG. 6, a cylindrical bore 121 is formed within the body section 104 of the lower tool unit 20 and receives a piston 122 which is secured to the tubular member 110 by a set of retaining rings 123. A set of resilient O-rings form seals between the piston 122, the tubular member 110 and the body section 104. A compression spring 126 normally biases or urges the piston 122 and tubular member 110 upwardly, and the spring 126 is retained by the lower body section 106. The tubular member 110 has an enlarged cylindrical closure portion 129 (FIGS. 6 & 7) which has a tapered or frusto-conical shoulder surface 131, and the tubular member 110 includes a downwardly projecting extension tube 133. A small air passage 136 (FIG. 7) is formed within the tubular portion 129 and connects with an air passage 138 within the body section 106. A pressure actuated relief valve 140 is enclosed within the body sections 104 and 106 between the passage 138 and a port 142 which receives a fitting 144. The fitting is connected to a pressurized air supply line (not shown) for directing pressurized air through the valve 140 and through the passages 138 and 136 into the reservoir through an opening 148 (FIGS. 2 and 4) extending from the inlet 44 within the reservoir 40 and surrounding the extension tube 133 with clearance. The pressurized air is used to control the level of the fluid or liquid within the reservoir after it is filled.

Referring to FIGS. 2 and 5, a pair of diametrically opposed clamping members or fingers 152 are recessed within corresponding slots 154 formed within the upper tool unit 18 and lower tool unit 20, and the fingers are pivotally supported by pivot pins 156 in a manner similar to the clamping fingers disclosed in above-mentioned U.S. Pat. No. 6,257,285. The fingers 152 have inwardly projecting bottom tab portions 158 which are adapted to project under a flange 162 on the neck portion 42 of the reservoir 40 after the extension tube 133 is inserted into the inlet opening 148 of the reservoir 40. The clamping fingers 152 are normally biased outwardly by a set of pistons 164 retained within corresponding bores formed within the body section 26 and engaging the fingers below the pivot pins 156. Compression springs 166 are retained within the pistons to urge the pistons and fingers 152 outwardly to uncapped positions. A pair of fluid or air actuated pistons 168 are confined within corresponding bores within the top body section 22, and the pistons 168 receive pressurized air through the control line connected to the fitting 68 when it is desired to pivot the fingers 152 inwardly to their clamping positions (FIG. 2) to couple the tool assembly 15 to the fluid receiving system or reservoir 40.

After the tool assembly 15 is connected or coupled to the reservoir 40 of the fluid receiving system, pressurized air is supplied to the upper surface of the piston 122 through a passage 172 (FIG. 4) and a fitting 173 connected to a flexible air pressure line. The fitting 173 is shown diametrically opposite the fitting 144 in FIG. 4 for simplification. However, the fitting 173 is actually located adjacent the fitting 144, as shown in FIGS. 1 and 3. When the top of the piston 122 is pressurized, the metal tubular member 110 shifts or moves downwardly until the annular metal shoulder or surface 131 (FIG. 7) on the tubular member 110 contacts and forms a seal with an annular plastic seat 176 formed within the neck portion 42 of the molded plastic reservoir 40 above the inlet 44. Preferably, the surface 131 is formed to produce annular line contact with the seat 176 to produce a positive fluid-tight annular seal between the tool assembly 15 and the reservoir 40 without the use of a resilient O-ring seal. The neck portion 42 of the reservoir 40 may be provided with a fitting 178 (FIG. 4) to provide for filling an overflow container or bottle after the tubular member 110 is retracted upwardly to release the seal between the surface 131 and seat 176.

As mentioned above, when it is desired to remove the lower tool unit 20 from the upper tool unit 18 for replacement with another tool unit 20 which is constructed to connect and seal with another inlet portion of a different fluid receiving system, a finger is used to actuate the quick release coupler 85 by pressing upwardly on one of the tabs 96 so that the unit 20 is pushed downwardly from the unit 18, as shown in FIG. 6 without the use of any hand tools. Another unit 20 may have an outlet tube 133 of different configuration or different size, or the closure portion 129 of the tube member 110 may have a different diameter or a different annular sealing surface 131 according to the size and/or configuration of the new fluid receiving system. After the tool assembly 15 is connected or coupled to the inlet portion of a fluid receiving system, the operation of the tool assembly may be substantially the same as disclosed in above mentioned U.S. Pat. No. 6,257,285, including evacuation of the fluid system, and/or pressure testing of the system and/or filling or charging of liquid into the system.

As also mentioned above, when a tool assembly 15 is used to evacuate and/or charge a predetermined volume of liquid into a fluid receiving system having a molded plastic inlet portion such as the reservoir 40, a positive and effective fluid-tight seal may be obtained between the metal annular surface 131 and the plastic annular surface or seat 176 on the inlet portion of the fluid receiving system. This feature eliminates the need for a resilient annular sealing ring and also eliminates the need to replace the sealing ring periodically. Thus there is no down time of the tool assembly as commonly required to replace a resilient sealing ring.

While the form of tool assembly herein described constitutes a preferred embodiment of the invention, it is to be understood that the invention is not limited to this precise tool assembly, and that changes may be made therein without departing from the scope and spirit of the invention as defined in the appended claims.

What is claimed is:

1. A fluid dispensing tool assembly adapted to be releasably connected to a fluid system for first evacuating the system and then filling the system with a charge of fluid, said tool assembly comprising an upper tool unit including a body defining an evacuation port adapted to be connected to a suction tube and a fluid inlet port adapted to be connected to a source of fluid, a power actuated valve member within said upper tool unit for each of said ports and supported by said upper tool unit for movement between an open position and a closed position for the corresponding said port, a lower tool unit releasably connected to said upper tool unit and including an annular body having an upwardly projecting tubular portion surrounding an elongated center tube member defining a fluid passage, with said tubular portion and said tube member projecting upwardly into said body of said upper tool unit, a sealing member on said lower tool unit to form a fluid-tight seal between said center tube member within said lower tool unit and an annular seat on the fluid system, movable clamping members for releasably connecting said lower tool unit to the fluid system when said lower tool unit is connected to said upper tool unit, a quick release coupler supported by said body of said upper tool unit and releasably connecting said lower tool unit to said upper tool unit to connect said passage within said tube member selectively to said evacuation port and said fluid inlet port in response to actuation of the corresponding said valve members, said quick release coupler including a spring biased tubular locking sleeve surrounding said center tube member and supported for axial movement within said body of said upper tool unit between a released position and a locked position, said locking sleeve surrounding a set of balls engaging said upwardly projecting tubular portion of said body of said lower tool unit, and said lower tool unit and said center tube member being quickly releasable and removable from said upper tool unit in response to axial movement of said sleeve while each said valve member is in said closed position in said upper tool unit to provide for quickly connecting a different said lower tool unit to said upper tool unit.

2. A tool assembly as defined in claim 1 wherein said center tube member has a tapered upper end surface and said upwardly projecting tubular portion of said body of said lower tool unit has a tapered outer annular surface to provide for quickly coupling said lower tool unit to said upper tool unit in response to inserting said tubular portion of said body of said lower tool unit axially into said sleeve of said upper tool unit.

3. A tool assembly as defined in claim 1 and including a spring biased ring and a resilient sealing ring within a tubular support for said locking sleeve and receiving said tubular portion and said center tube member of said lower tool unit when said lower tool unit is inserted upwardly into said upper tool unit.

4. A tool assembly as defined in claim 1 wherein said body of said lower tool unit has a bore receiving a movable fluid actuated annular piston connected to said center tube member for moving said tube member axially between an upper position and a lower position, and said lower tool unit has fluid passages for supplying pressurized fluid to the fluid system around said bore and said piston.

5. A tool assembly as defined in claim 1 wherein said annular body of said lower tool unit includes an upper body section and a lower body section secured together, an axially movable piston within said annular body of said lower tool unit and connected to said center tube member for moving said tube member axially within said lower tool unit, and said center tube member includes a portion projecting downwardly from said lower body section after said lower tool unit is released and removed from said upper tool unit.

6. A tool assembly as defined in claim 5 and including a compression spring urging said piston and said center tube member upwardly within said body of said lower tool unit.

* * * * *